July 24, 1928.                                                    1,678,315
W. J. BELCHER
CONNECTING PIN FOR LINK CHAINS
Filed Dec. 22, 1924
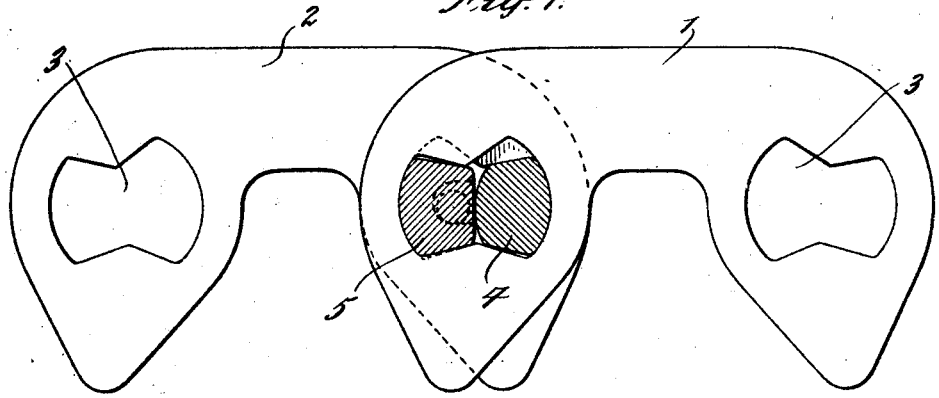
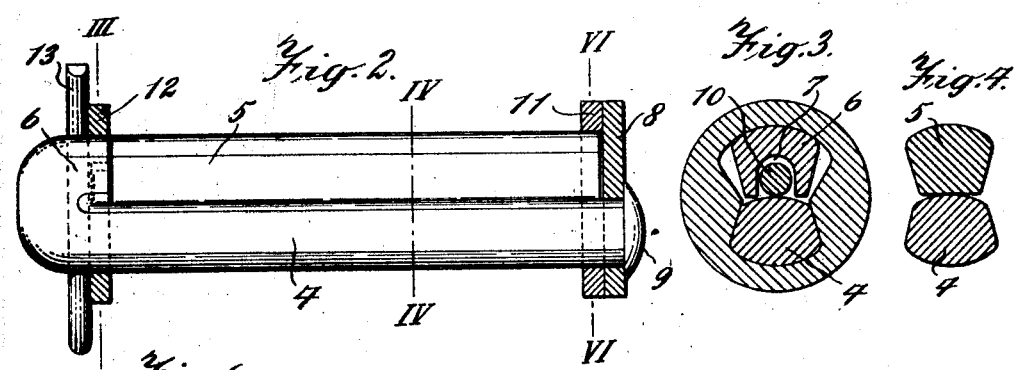
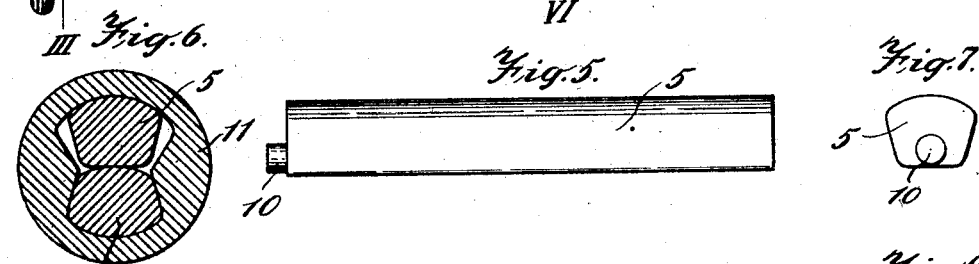
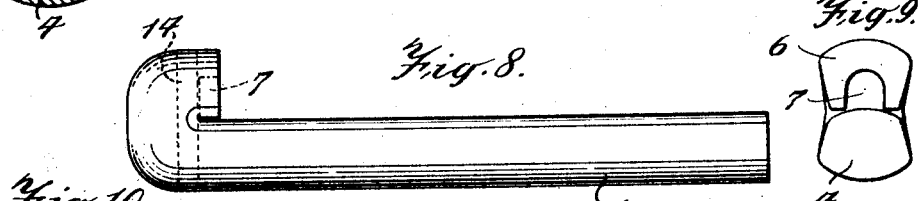
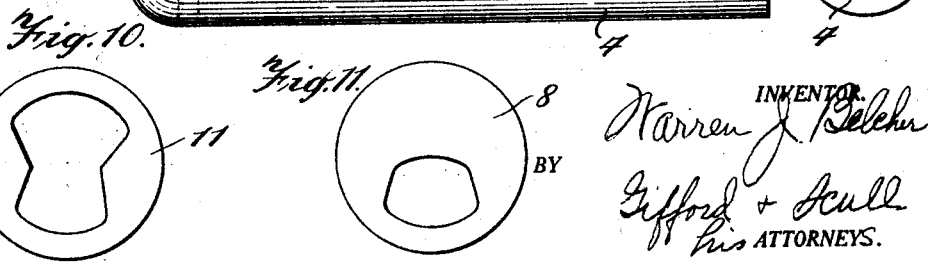

Patented July 24, 1928.

1,678,315

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

CONNECTING PIN FOR LINK CHAINS.

Application filed December 22, 1924. Serial No. 757,316.

My invention relates to a connecting pin for chains, and particularly to a pin for connecting the chains of silent link type.

It is now common practice to employ chains of the silent type on the front ends of automobiles and many times the joints of such chains are provided with two-part pintles arranged to cooperate with each other so as to permit the desired flexing of the chain as it passes around the sprocket. It frequently happens that after these chains have operated for a considerable period of time the pintles become broken or so worn that it is desirable to supply a new pintle to the joint. Many times the design of the engine is such that the chain cannot be removed for repair without partially dismantling the engine, which of course is expensive. In such case it is practically impossible to insert a new pintle, particularly if the pintle has two or more parts.

My invention is designed particularly to facilitate the application of the pintle under such circumstances as above set forth. In order to accomplish this purpose I have therefore designed a pintle having two parts cooperating in any desired manner and so arranged relative to each other that the two parts will remain in their operative positions prior to their introduction into the links.

My invention will be better understood by reading the following description taken in connection with the accompanying drawings illustrating one embodiment of the invention, and in which, Fig. 1 is a side elevation of two links with one of my pins in place, the pin being shown in section;

Fig. 2 is a side elevation, partly in section, of one of my pins;

Fig. 3 is a section on the line III—III of Fig. 2;

Fig. 4 is a section on the line IV—IV of Fig. 2;

Fig. 5 is a side elevation of one member of the pin;

Fig. 6 is a section on the line VI—VI of Fig. 2;

Fig. 7 is an end view of the left-hand end of the member shown in Fig. 5;

Fig. 8 is a side elevation of the other member of the pin;

Fig. 9 is an end view from the right-hand end of the member shown in Fig. 8;

Fig. 10 is a side elevation of one of the washers; and

Fig. 11 is a side elevation of another of the washers.

Referring to the drawings, the links 1 and 2 are of the usual form and are provided with openings 3 in their ends for the reception of the pintles. The openings 3 may be of any desired form and do not constitute any part of my present invention. The pintle comprises two parts 4 and 5. In the particular instance shown in the drawings, part 4 has a convex surface and the part 5 a flat surface cooperating with the convex surface of the part 4. The form of these surfaces has nothing to do with my invention, however.

In constructing one of the devices shown complete in Fig. 2, I take a member 4 and bend a portion 6 thereof back upon the body portion. Before bending the part 6 to the position shown in Fig. 2, however, an indentation 7 is made therein so that when the part 6 is bent back into the position shown in Fig. 2, a recess is formed for a purpose which will appear later. A washer 8, shown in Fig. 11, is then placed on the end of the member 4 and the end of the member 4 is riveted over at 9 so as to prevent the washer 8 from slipping off the end of the member 4. The member 5, shown in Fig. 5, is of the same general cross section as the member 4, but as shown in the drawings, the member 5 has a flat surface which cooperates with the convex surface of the member 4. The member 5 is provided with a projection 10 on one end thereof which enters the recess formed by the indentation 7. The recess is of sufficient size to permit the projection 10 to move freely therein when the parts 4 and 5 move relatively to each other during the flexing of the joint. In assembling the parts to the position shown in Fig. 2, the parts 4 and 5 are placed in the relative position shown by inserting the projection 10 into the recess 7 and moving the right-hand end of the member 5 down so that the parts 4 and 5 are parallel with each other. A washer 11 of the form shown in Fig. 10 is then slipped over the left-hand end of the members 4 and 5 and these assembled parts are then pushed through the openings in the links 1 and 2. The length of the pintle is so selected relative to the width of the chain that the left-hand end of the pintle, as shown in Fig. 2, projects beyond the edge of the chain. A washer 12, like that shown in Fig. 10, is then slipped over the projecting end of the pintle and a cotter pin or other similar device, is placed in the opening 14 in the member 4. It will be noted that the opening in the washers 11 and 12 is identical with the openings in the ends of the links. From this it will be apparent that the free movements of the parts 4 and 5 are not interfered with by the washers.

From the foregoing it will be evident that the parts 4 and 5 are in the position shown in Fig. 2 and the washer 11 is placed in the position shown, the two parts 4 and 5 from all intents and purposes are as one piece and the bent portion 6 forms a tapered end which may be readily pushed through the registering openings in the chain links without fear of the parts 4 and 5 separating. This construction therefore enables the mechanic to readily slip the two parts 4 and 5 through the chain links with as much ease as if the pintle were composed of one part only; this construction also permits free relative movement between the parts 4 and 5 as the joint is flexed. By the construction described all the disadvantages above enumerated are avoided and many advantages secured.

Many other advantages will be apparent to those skilled in the art.

I claim:

1. A connecting pin for link chains comprising two parts having coacting outside surfaces, one of said parts being bent back upon itself and the other having a portion engaging the bent-back part to hold said parts together.

2. A connecting pin for link chains comprising two parts having coacting outside surfaces, one of said parts having an overhanging portion and the other part having a portion cooperating with the overhanging portion, said portions acting to hold said parts in cooperative relation.

3. A connecting pin for double pintle chains comprising two parts, each having a cross section substantially identical with the corresponding pintle parts, one of said parts having an overhanging portion at one end, and the other part having a portion cooperating with the overhanging portion to hold said parts in coactive relation.

4. A connecting pin for double pintle chains comprising two parts, each having a cross section substantially identical with the corresponding pintle parts, one of said parts having a bent-back portion and the other part having a portion cooperating with the bent-back portion to hold said parts in coactive relation.

5. A connecting pin for link chains comprising two parts, said parts having coacting portions at one end and a means at the other end whereby said parts are held in coactive relation.

6. A connecting pin for link chains comprising two parts, said parts having coacting portions at one end and a washer at the other end having an opening similar to the link openings whereby said parts are held in coactive relation.

WARREN J. BELCHER.

CERTIFICATE OF CORRECTION.

Patent No. 1,678,315.                      Granted July 24, 1928, to

WARREN J. BELCHER.

It is hereby certified that error appears in the printed specification of the above numbered patent requiring correction as follows: Page 2, line 13, after the word "that" insert the word "after"; and that the said Letters Patent should be read with this correction therein that the same may conform to the record of the case in the Patent Office.

Signed and sealed this 21st day of August, A. D. 1928.

(Seal)

M. J. Moore,
Acting Commissioner of Patents